(12) United States Patent
Thompson

(10) Patent No.: US 6,859,138 B2
(45) Date of Patent: Feb. 22, 2005

(54) KEY DETECTION SWITCH FOR VEHICLE ENTRY AND SECURITY SYSTEMS

(75) Inventor: Peter Gordie Thompson, Romeo, MI (US)

(73) Assignee: General Motors Corporation, Detroit, MI (US)

( * ) Notice: Subject to any disclaimer, the term of this patent is extended or adjusted under 35 U.S.C. 154(b) by 451 days.

(21) Appl. No.: 10/003,965

(22) Filed: Oct. 31, 2001

(65) Prior Publication Data

US 2003/0080858 A1 May 1, 2003

(51) Int. Cl.[7] ............................................. B60R 25/10
(52) U.S. Cl. ................. 340/426.17; 307/10.1; 340/426.13
(58) Field of Search ....................... 340/426.13, 426.14, 340/426.17, 426.18, 426.28, 426.29, 426.35, 426.36; 307/10.1, 10.2

(56) References Cited

U.S. PATENT DOCUMENTS

| | | | | |
|---|---|---|---|---|
| 4,342,209 A | * | 8/1982 | Kleefeldt | 70/264 |
| 5,543,776 A | * | 8/1996 | L'Esperance et al. | 340/426.25 |
| 5,638,712 A | * | 6/1997 | Kuroda | 70/268 |
| 5,666,834 A | * | 9/1997 | Inoue | 70/237 |
| 5,862,691 A | * | 1/1999 | Friedrich et al. | 70/264 |
| 5,965,953 A | * | 10/1999 | Ikeda et al. | 307/10.2 |

* cited by examiner

Primary Examiner—Brent A. Swarthout
(74) Attorney, Agent, or Firm—Christopher DeVries

(57) ABSTRACT

A vehicle entry and security system includes a key cylinder that is operated using a key. A first cable has one end attached to the key cylinder. A mechanical actuator is attached to an opposite end of the first cable. A second cable has one end attached to the mechanical actuator. A latch is connected to an opposite end of the second cable and releases a door or a trunk. The mechanical actuator triggers a switch when the key operates the key cylinder. A vehicle security system triggers an alarm when the door or trunk is opened without using a key fob. The vehicle security system monitors the state of the switch and prevents the alarm from being triggered when the switch is in a second state. When the key is operated a first number of times within a first period, the vehicle security system reprograms the key fob.

11 Claims, 3 Drawing Sheets

KEY DETECTION SWITCH FOR VEHICLE ENTRY AND SECURITY SYSTEMS

TECHNICAL FIELD

The present invention relates to vehicle entry and security systems, and more particularly to a key detection switch for a vehicle entry and security system.

BACKGROUND OF THE INVENTION

Purchasers of vehicles such as passenger automobiles and trucks have come to expect keyless entry systems. These purchasers also expect integrated vehicle security systems that will deter theft. Keyless entry systems include a key fob with a transmitter and a receiver. The key fob includes several buttons that provide different remote entry and emergency functions. Most drivers rarely use a key to enter their vehicle once they begin using the keyless entry system. The key fob is usually attached to the key. The driver can also use the key to manually lock or unlock the doors or trunk of the vehicle.

The key fob usually includes an unlock button that unlocks the doors of the vehicle to allow entry without using the key. The unlock button also typically disables the vehicle security system to prevent triggering of the alarm that is associated with the vehicle security system. A trunk unlock button typically unlocks the trunk of the vehicle. The trunk unlock button also typically disables the vehicle security system to prevent triggering of the alarm. A lock button locks the doors of the vehicle and enables the alarm to prevent theft. A panic button sounds the horn and/or flashes the lights of the vehicle when pressed. The panic button is typically used by the driver to signal an emergency. The key fob may also include other buttons and/or functions depending upon the particular vehicle and application.

SUMMARY OF THE INVENTION

A vehicle entry and security system according to the invention includes a key cylinder that is operated using a key. A first cable has one end attached to the key cylinder. A mechanical actuator is attached to an opposite end of the first cable. A second cable has one end attached to the mechanical actuator. A latch is connected to an opposite end of the second cable and releases a door or a trunk of a vehicle. A switch has a first and second state. The mechanical actuator moves the switch from the first state to the second state when the key operates the key cylinder.

In other features of the invention, the mechanical actuator rotates, pivots, slides, or otherwise moves to actuate the switch. The vehicle entry and security system further includes a key fob including a controller. A transmitter, a receiver, and a plurality of buttons are connected to the controller.

In other features, a vehicle security system includes a controller and a transmitter and a receiver connected to the controller. The vehicle security system triggers an alarm when the door or the trunk is opened without using the key fob. The vehicle security system monitors the state of the switch and prevents the alarm from being triggered when the switch is in the second state.

In still other features, when the key is operated a first predetermined number of times within a first predetermined period, the vehicle security system reprograms the key fob. The mechanical actuator is mounted to the housing. The first cable forms part of a cable assembly that includes at least one end connector and a sheath. The end connector is connected to the housing.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 3 illustrates an end connector of a cable assembly that is attached to a housing;

DESCRIPTION OF THE PREFERRED EMBODIMENT

The following description of the preferred embodiment(s) is merely exemplary in nature and is in no way intended to limit the invention, its application, or uses.

Figure 1:
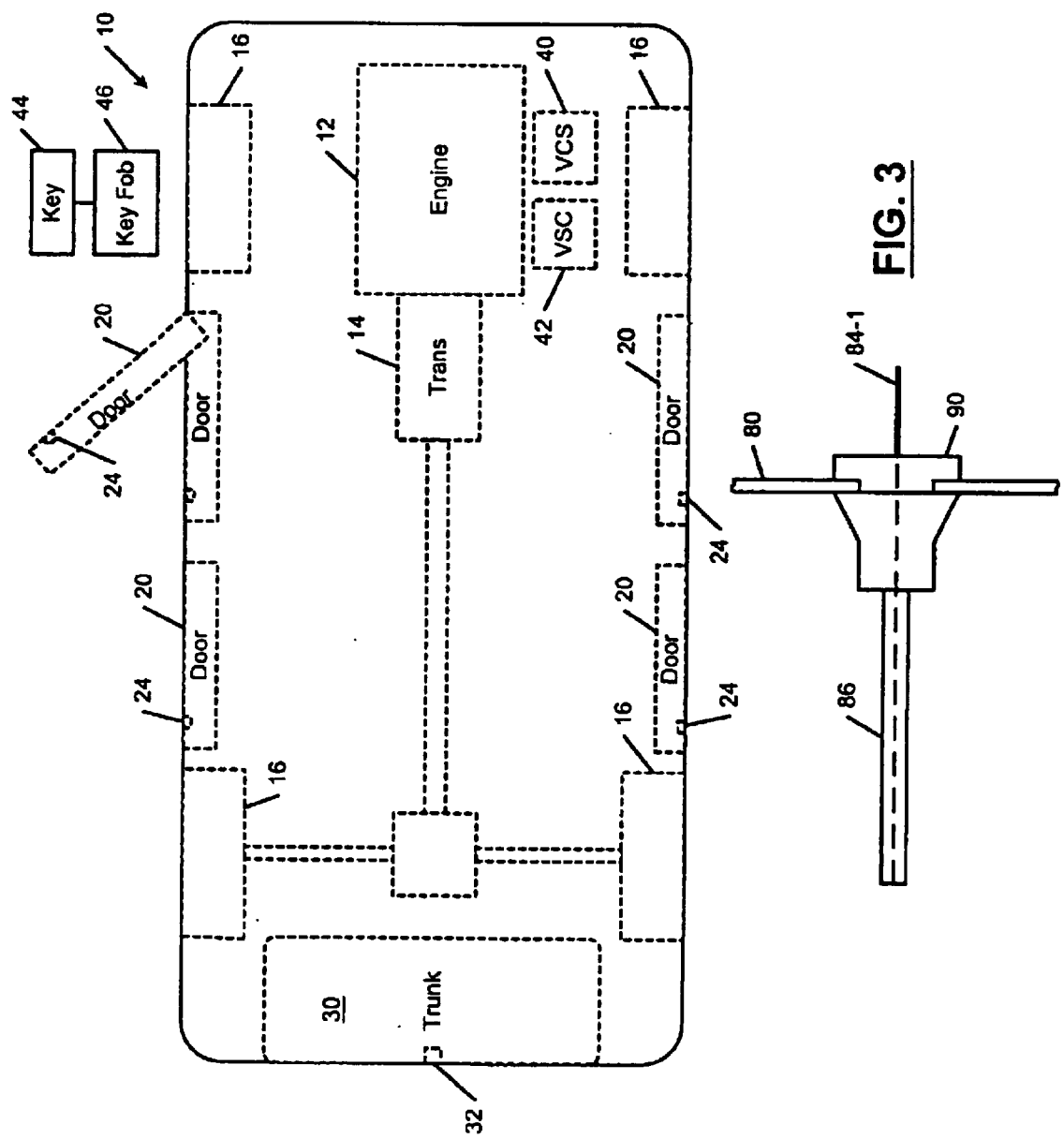
FIG. 1 is a functional block diagram of a vehicle including a keyless entry and vehicle security system according to the present invention.

Referring now to FIG. 1, a vehicle 10 includes an engine 12, a transmission 14, and front and rear wheels 16. Th engine 12 and transmission 14 drive the front and/or rear wheels 16. The vehicle 10 further includes one or more doors 20 that include a key cylinder 24. The key cylinder 24 is adapted to receive a key that unlocks the door 20. The vehicle 10 includes a rear deck lid or trunk 30 that also includes a key cylinder 32. The key cylinder 32 may be located on the trunk 30 or on the body of the vehicle 10 adjacent to the trunk 30. The vehicle 10 further includes a vehicle controller 40 and a vehicle security controller 42 that will be described below. Either a key fob 44 or a key 46 can be used to lock and/or unlock the vehicle 10 and disable an alarm.

Figure 2:
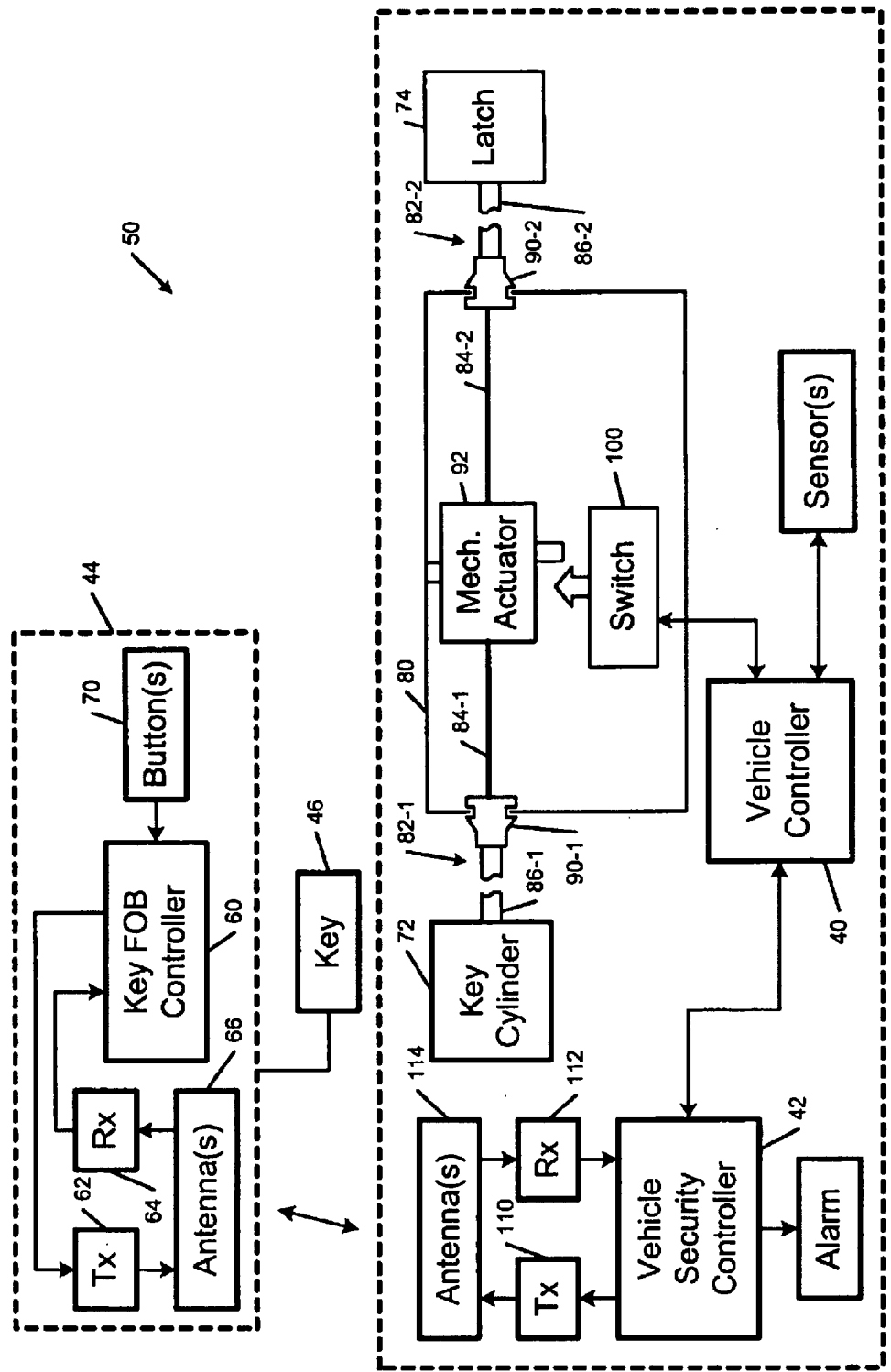
FIG. 2 is a functional block diagram of the keyless entry and vehicle security system according to the present invention in further detail.

Referring now to FIG. 2, a keyless entry and vehicle security system 50 is shown. The keyless entry and vehicle security system 50 includes the key fob 44 and the key 46. The key fob 44 and the key 46 are typically attached to each other by a ring (not shown). The key fob 44 includes a key fob controller 60, a transmitter 62, a receiver 64, one or more antennas 66, and one or more buttons 70 that trigger various functions of the key fob 44.

The vehicle 10 includes one or more key cylinders 72 that are mechanically connected to one or more latches 74. The key 46 is inserted into the key cylinder 72 and rotated or turned to unlock the trunk 30 or the door 20 that is associated with the latch 74. A housing 80 is attached to an inner structure of the vehicle 10. A cable assembly 82-1 includes a cable 84-1, a sheath 86-1, and one or more end connectors 90-1. The end connectors 90 allow the cable to move in both directions relative to the sheath. The latch 74 is connected to the cable assembly 82-2.

A mechanical actuator 92 is connected to one end of the cable 84-1 and to one end of the cable 84-2. The mechanical actuator 92 is connected to and movable with respect to the housing 80. The mechanical actuator 92 moves by rotating, pivoting, sliding or any other form of movement. When the driver inserts the key 46 into the key cylinder 72 and rotates the key 46, the key cylinder 72 adjusts or moves the cable 84-1. The cable 84-1 adjusts or moves the mechanical actuator 92. The mechanical actuator 92 adjusts or moves the cable 84-2. The cable 84-2 actuates the latch 74, which releases the trunk 30 or the door 20 or actuates another device.

The mechanical actuator 92 also triggers a switch 100 that changes state. The vehicle controller 40 senses the state of the switch 100. When the switch 100 is in the second state, the key 46 has been used to unlock or open a door 20 or trunk 30. The vehicle controller 40 sends a signal to the vehicle security controller 42 signifying that the key 46 has been used to enter the vehicle and/or open the truck. The vehicle security controller 42 disables (or does not trigger) an alarm that would otherwise be triggered due to a vehicle entry without using the key fob 44.

The vehicle security controller 42 is connected to a transmitter 110, a receiver 112, and one or more antennas 114. The vehicle security controller 42 communicates with the key fob 44 controller 60 via radio frequency (RF) signals.

Figure 4:
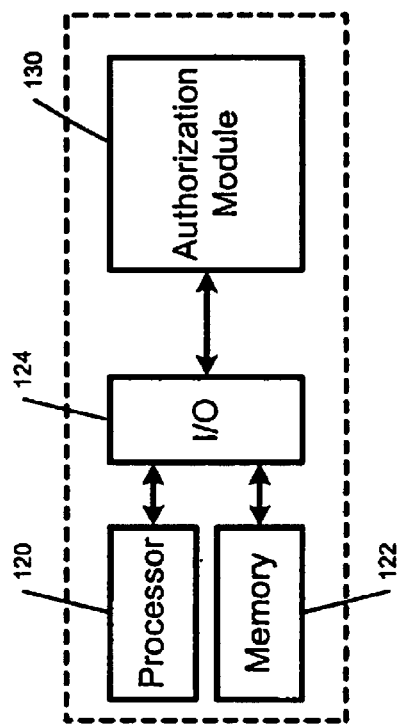
FIG. 4 is a functional block diagram of one of a vehicle security controller and a vehicle controller.

Referring now to FIG. 4, a functional block diagram illustrating the vehicle controller 40 and/or the vehicle security controller 42 is shown. The vehicle controller 40 and/or the vehicle security controller 42 includes a processor 120, memory 122 (such as read only memory (ROM), random access memory (RAM), flash memory, or other suitable electronic storage), and an input/output (I/O) interface 124. The vehicle controller 40 and the vehicle security controller 42 can also be combined into a single processor/memory device. Alternately, additional processors may be employed. An authorization module 130 executes an authorization algorithm as will be described further below.

Figure 5:
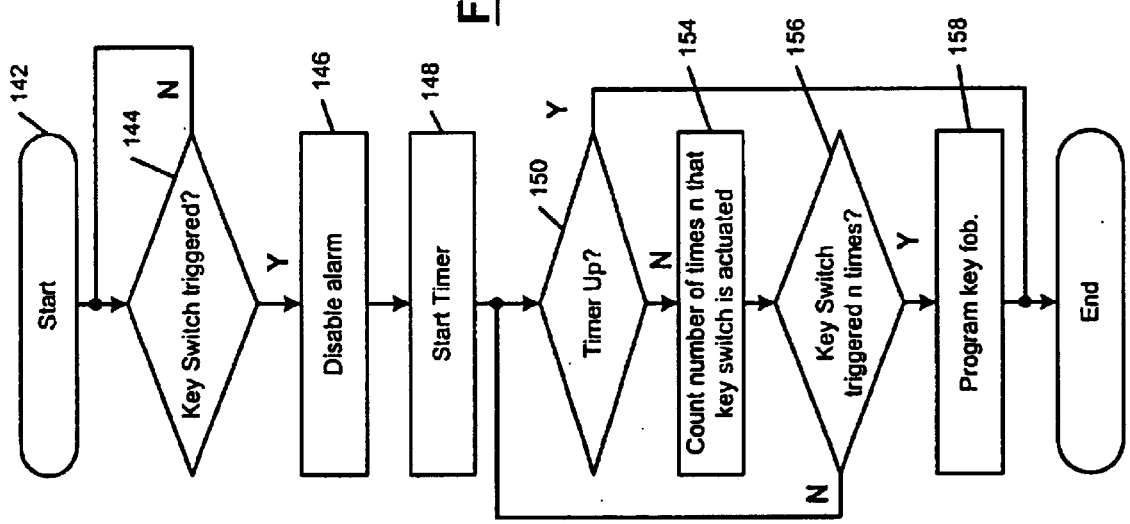
FIG. 5 is a flow chart illustrating steps for operating the keyless entry and vehicle security system according to the present invention.

Referring now to FIG. 5, a flow chart illustrating steps performed by the authorization algorithm are shown generally at 140. The authorization algorithm can be performed by the vehicle controller 40 and/or the vehicle security controller 42. Control begins with step 142. In step 144, the controller determines whether the key switch has been triggered using the key 46. If not, control loops back to step 144. Otherwise, the controller continues with step 146 where the controller disables the alarm. In step 140, the controller starts a timer and continues with step 150. In step 150, the controller determines whether the timer is up. If not, the controller counts the number of times that the key switch is actuated in step 154. In step 156, the controller determines whether the key switch 100 has been triggered n times. If not, control loops back to step 150. Otherwise control continues with step 158 where the controller reprograms the key fob 44. When a timer is up in step 150, control ends.

In use, the driver enters the vehicle 10 using the unlock button on the key fob 44. The vehicle security controller 42 automatically disables the alarm. Alternately, the driver enters the vehicle 10 using the key 46. The key cylinder 24 moves the cable 84-1 which moves the mechanical actuator 92. The mechanical actuator 92 moves the cable 84-2 which releases the latch 74. The latch 74 opens the trunk, door or other device. The mechanical actuator 92 also triggers the switch 100. The vehicle controller 40 senses the state of the switch 100 and sends a signal to the vehicle security controller 42 that the key 46 was used to enter the vehicle 10. The vehicle security controller 42 disables or does not trigger the alarm. When the driver turns the key 46 several times during a predetermined period, the vehicle security controller 42 reprograms the key fob 44.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A vehicle entry and security system comprising:

a key cylinder that is operated using a key;

a first cable having one end attached to said key cylinder;

a mechanical actuator attached to an opposite end of said first cable;

a second cable having one end attached to said mechanical actuator;

a latch that is connected to an opposite end of said second cable and that is operable to release one of a door and a trunk of a vehicle;

a switch that has a first and second state, wherein said mechanical actuator moves said switch from said first state to said second state when said key operates said key cylinder;

a key fob including a key fob controller in communication with a controller of the vehicle entry and security system;

a transmitter connected to said key fob controller;

a receiver connected to said key fob controller;

a plurality of buttons connected to said key fob controller;

wherein said vehicle security system triggers an alarm when said one of said door and said trunk is opened without using said key fob; and wherein said vehicle security system monitors said state of said switch and prevents said alarm from being triggered when switch is in said second state.

2. The vehicle entry and security system of claim 1 wherein said mechanical actuator pivots to actuate said switch.

3. The vehicle entry and security system of claim 1 wherein said mechanical actuator slides to actuate said switch.

4. The vehicle entry and security system of claim 1 wherein when said key is operated a first predetermined number of times within a first predetermined period, said vehicle security system reprograms said key fob.

5. The vehicle entry and security system of claim 1 wherein said mechanical actuator is mounted inside a housing.

6. The vehicle entry and security system of claim 5 wherein said first cable forms part of a first cable assembly that also includes a first end connector and a sheath and wherein said first end connector is connected to said housing.

7. The vehicle entry and security system comprising:

a key cylinder that is operated using a key;

a key fob including a controller, a transmitter and a receiver that are connected to said controller, and a button that is connected to said controller;

a housing;

a first cable assembly including a first cable and a first end connector that is attached to said housing, wherein one end of said first cable is attached to said key cylinder;

a mechanical actuator connected to said housing and to an opposite end of said first cable;

a second cable assembly including a second cable and a second end connector that is attached to said housing, wherein one end of said second cable is attached to said mechanical actuator;

a latch that is connected to an opposite end of said second cable and that releases one of a door and a trunk of a vehicle;

a switch that has a first and second states, wherein said mechanical actuator moves said switch from said first state to said second stare when said key operates said key cylinder; and a vehicle security system that includes alarm and that unlocks said one of said door and said trunk and disables said alarm when said key fob is used, that triggers an alarm when said one of said door and said trunk is opened without using said key fob, and that monitors a state of said switch and prevents said alarm from being triggered when said switch is moved to said second state by said key.

8. The vehicle entry and security system of claim 7 wherein said mechanical actuator pivots to actuate said switch.

9. The vehicle entry and security system of claim 1 wherein said mechanical actuator slides to actuate said switch.

10. The vehicle entry and security system of claim 7 wherein said vehicle security system includes a controller and a transmitter and a receiver connected to said controller.

11. A vehicle entry and security system of claim 10 wherein when said key is operated a first predetermined number of times within a first predetermined period, said vehicle security system reprograms said key fob.

* * * * *